United States Patent
Okada

(10) Patent No.: US 8,017,532 B2
(45) Date of Patent: Sep. 13, 2011

(54) QUASI-UNIDIRECTIONAL FABRICS FOR STRUCTURAL APPLICATIONS, AND STRUCTURAL MEMBERS HAVING SAME

(75) Inventor: Ryo Okada, Toronto (CA)

(73) Assignee: Barrday Inc., Cambridge, Ontario (CA)

( * ) Notice: Subject to any disclaimer, the term of this patent is extended or adjusted under 35 U.S.C. 154(b) by 399 days.

(21) Appl. No.: 12/390,675

(22) Filed: Feb. 23, 2009

(65) Prior Publication Data

US 2009/0214815 A1 Aug. 27, 2009

Related U.S. Application Data

(60) Provisional application No. 61/030,587, filed on Feb. 22, 2008.

(51) Int. Cl.
*D03D 11/00* (2006.01)
*D03D 13/00* (2006.01)
*B32B 5/12* (2006.01)

(52) U.S. Cl. ........ 442/205; 442/185; 442/195; 442/203; 428/107

(58) Field of Classification Search .................. 442/185, 442/195, 203, 205; 428/107
See application file for complete search history.

(56) References Cited

U.S. PATENT DOCUMENTS

| | | | |
|---|---|---|---|
| 2,893,442 A * | 7/1959 | Genin | 139/383 R |
| 3,592,025 A | 7/1971 | Sharpe | |
| 3,819,461 A | 6/1974 | Saffadi | |
| 4,193,828 A | 3/1980 | Moores et al. | |
| 4,320,160 A | 3/1982 | Nishimura et al. | |
| 4,407,885 A | 10/1983 | Murphy et al. | |
| 4,416,929 A | 11/1983 | Krueger | |
| 4,484,459 A | 11/1984 | Hutson | |
| 4,550,045 A | 10/1985 | Hutson | |
| 5,014,755 A | 5/1991 | Bompard et al. | |
| 5,085,252 A | 2/1992 | Mohamed et al. | |
| 5,091,245 A | 2/1992 | Phillips | |
| 5,100,713 A | 3/1992 | Homma et al. | |
| 5,396,932 A | 3/1995 | Homma et al. | |
| 5,465,760 A | 11/1995 | Mohamed et al. | |
| 5,752,550 A | 5/1998 | Scari' et al. | |
| 5,763,043 A | 6/1998 | Porter et al. | |
| 5,783,278 A | 7/1998 | Nishimura et al. | |
| 5,952,067 A | 9/1999 | Head | |
| 6,129,122 A | 10/2000 | Bilisik | |
| 6,655,416 B2 | 12/2003 | Serillon | |
| 6,845,791 B2 | 1/2005 | Schneider et al. | |
| 6,846,548 B2 | 1/2005 | Harpell et al. | |
| 6,861,378 B2 | 3/2005 | Cunningham et al. | |

(Continued)

*Primary Examiner* — Norca L Torres Velazquez
(74) *Attorney, Agent, or Firm* — Bereskin & Parr LLP

(57) ABSTRACT

According to one aspect, a fabric for use in structural applications, having a first layer of structural yarns comprising first structural yarns aligned in a first direction, a second layer of structural yarns comprising second structural yarns aligned in a second direction at an angle relative to the first direction, the second layer of structural yarns disposed on top of the first layer of structural yarns, first encapsulating yarns disposed on the second layer of structural yarns, the first encapsulating yarns being aligned with the first structural yarns, and second encapsulating yarns being aligned with the second structural yarns, the second encapsulating yarns being alternatively woven above one of the first encapsulating yarns and below one of the first structural yarns such that the first encapsulating yarns and second encapsulating yarns cooperate to secure the first layer of structural yarns to the second layer of structural yarn. The first and second encapsulating yarns may have tenacities and tensile moduli substantially less than tenacities and tensile moduli of the first and second structural yarns.

22 Claims, 7 Drawing Sheets

U.S. PATENT DOCUMENTS 6,995,099 B1 2/2006 Nishimura et al.
2002/0164911 A1 11/2002 Cunningham et al.
2004/0224592 A1 11/2004 Cuningham et al.
2007/0099526 A1 5/2007 Heerden et al.

* cited by examiner

QUASI-UNIDIRECTIONAL FABRICS FOR STRUCTURAL APPLICATIONS, AND STRUCTURAL MEMBERS HAVING SAME

RELATED APPLICATIONS

This application claims the benefit of U.S. Provisional Application No. 61/030,587, filed on Feb. 22, 2008 and entitled QUASI-UNIDIRECTIONAL FABRIC FOR STRUCTURAL APPLICATIONS, the entire contents of which are hereby incorporated by reference.

TECHNICAL FIELD

The teaching disclosed herein relates to woven quasi-unidirectional fabrics, and in particular, to quasi-unidirectional fabrics for use in composite materials for structural applications.

BACKGROUND

Unidirectional fabrics are fabrics in which the warp and weft yarns form parallel layers, without the over and under crimp of a woven structure. Without such an interwoven structure, some mechanism must be provided to hold the layers of unidirectional yarn together to form the fabric. Some known mechanisms include the use of resins, polymer films bonded to the individual layers, stitching, knitted fabric layers and woven fabric layers.

When unidirectional fabric is used in the reinforcement of composites, the composites generally have a number of layers of unidirectional yarns with at least two of the layers being oriented transversely (at 90 degrees) to each other. Typical arrangements include two yarn layers, with the first layer oriented at 0 degrees to the longitudinal direction of the fabric, and the second layer oriented at 90 degrees to first layer. In other arrangements, fabric layers may be oriented at +/−45 degrees to the longitudinal direction of the fabric.

In known composites, the yarn layers may be stitched together, usually with stitch lines that are closely spaced together. The angle at which the layers of yarns are oriented with respect to each other may be varied, and the spacing of the stitching and the length of the individual stitches may also be varied.

However, there are a number of drawbacks with stitched fabric. Since the stitched yarns are woven by needles that penetrate through the structural yarn during production, considerable gaps may be formed where the stitches are provided. Furthermore, the penetration of the needles may cause severe damage to the structural yarns.

Some fabrics have been produced with and without a thermoplastic film provided between the yarn layers. With film provided between the layers, the fabric may be hot pressed such that the film can soften or melt during pressing, thus bonding with the layers and serving as a resin system in the finished composite.

Another family of unidirectional fabrics involves impregnating a unidirectional layer of filaments of high performance yarn with a thermoplastic or thermoset resin system. Two layers of the resultant prepreg can then be cross-plied together at a predetermined angle (e.g. 90 degrees) to form a single sheet of material.

Unidirectional fabric may used to overcome some of the reduced performance in structural materials caused by the crimping found in woven fabrics. A prior art woven fabric 10 is shown in FIGS. 1 and 2, and includes warp yarns 12 and weft yarns 14 that are interwoven. The warp yarns 12 and weft yarns 14 in the fabric 10 are crimped, as each yarn is bent around other yarns at crossover points or nodes to provide an interlocking or interwoven structure. As a result of the crimping, less than optimal mechanical properties may be provided in the fabric 10.

Various techniques have been used to reduce the fabric crimp in woven fabrics and to spread the crossover points apart. One way to achieve this is by weaving yarn in a more open construction, while retaining the weave pattern. To achieve the desired performance, the individual yarns in the fabric must typically be flat and spread apart to provide an open construction for the fabric. Without flat, spread yarns, the interstices or gaps between the yarns tend to become excessive. This reduces the amount of fibre in a given volume in the final composite structure and tends to result in excess resin content required to fill in the gaps, reducing the overall performance.

Improvements in yarn manufacture and weaving technology have allowed some high performance yarns to be woven with little or no twist and with a resulting flat, spread yarn orientation to address the gap issue. However, there is a limit to the openness of the weave that can be achieved with a woven fabric. As the openness increases, the fabric tends to become more of a mesh or scrim as opposed to a true fabric, and may have little or no value in structural applications. In addition, the fabric may become so flimsy that it cannot be handled or cut without distorting the orientation of the yarns and ruining the fabric, making it difficult to work with.

Accordingly, there is a need for an improved high performance fabric for use in structural applications that includes at least some of the benefits of unidirectional fabrics and woven fabrics while overcoming at least some of the above noted disadvantages associated with such fabrics.

SUMMARY

According to one aspect of the invention, there is provided a fabric for use in structural applications, having a first layer of structural yarns comprising first structural yarns aligned in a first direction, a second layer of structural yarns comprising second structural yarns aligned in a second direction at an angle relative to the first direction, the second layer of structural yarns disposed on top of the first layer of structural yarns, first encapsulating yarns disposed on the second layer of structural yarns, the first encapsulating yarns being aligned with the first structural yarns, and second encapsulating yarns being aligned with the second structural yarns, the second encapsulating yarns being alternatively woven above one of the first encapsulating yarns and below one of the first structural yarns such that the first encapsulating yarns and second encapsulating yarns cooperate to secure the first layer of structural yarns to the second layer of structural yarns. The first and second encapsulating yarns may have tenacities and tensile moduli substantially less than tenacities and tensile moduli of the first and second structural yarns.

Each of the first encapsulating yarns may be overlaid on top of one of the first structural yarns.

The angle between the second direction and the first direction may be approximately 90 degrees.

The adjacent second encapsulating yarns may have a staggered weave pattern.

The first structural yarns and second structural yarns may be high-performance unidirectional yarns.

The first and second structural yarns may have a tenacity of at least about 15 grams per denier, and a tensile modulus of at least about 400 grams per denier.

The first and second structural yarns may be selected from the group consisting of aramid fibres, polyethylene fibers, liquid crystal polymer fibers, poly(p-phenylene-2,6-benzobisoxazole) (PBO) fibers, carbon, basalt and glass fibers.

The first and second encapsulating yarns may have a tenacity of approximately 7.9 grams per denier, and a tensile modulus of approximately 39.5 grams per denier.

The first and second encapsulating yarns may have a denier between approximately 20 and approximately 1000.

The first and second encapsulating yarns may be selected from the group consisting of natural fibers and synthetic fibers.

The first and second encapsulating yarns may be natural fibres selected from the group consisting of cotton, wool, sisal, linen, jute and silk.

The first and second encapsulating yarns may be synthetic fibers selected from the group consisting of cellulose, rayon, acrylics, modacrylics, polyamides, polyolefin, polyester, rubber, synthetic rubber and saran.

The diameter of the first and second encapsulating yarns may be between about 2.5% and about 14% of the diameter of the first and second structural yarns.

The first and second structural yarns may be generally flat unidirectional yarns.

According to another aspect of the invention, there is provided a structural member comprising a plurality of fabrics bonded together, each fabric having a first layer of structural yarns comprising first structural yarns aligned in a first direction, a second layer of structural yarns comprising second structural yarns aligned in a second direction at an angle relative to the first direction, the second layer of structural yarns disposed on top of the first layer of structural yarns, first encapsulating yarns disposed on the second layer of structural yarns, the first encapsulating yarns being aligned with the first structural yarns, and second encapsulating yarns being aligned with the second structural yarns, the second encapsulating yarns being alternatively woven above one of the first encapsulating yarns and below one of the first structural yarns such that the first encapsulating yarns and second encapsulating yarns cooperate to secure the first layer of structural yarns to the second layer of structural yarns. The first and second encapsulating yarns may have tenacities and tensile moduli substantially less than tenacities and tensile moduli of the first and second structural yarns.

In some embodiments, each of the first encapsulating yarns is overlaid on top of one of the first structural yarns. In some embodiments, the plurality of fabrics are bonded together by a resin. In some embodiments, the plurality of fabrics are bonded together by a film.

In yet another aspect of the invention, there is provided a rigid structural member comprising a plurality of fabrics bonded together, each fabric having a first layer of structural yarns comprising first structural yarns aligned in a first direction, a second layer of structural yarns comprising second structural yarns aligned in a second direction at approximately 90 degrees relative to the first direction, the second layer of structural yarns disposed on top of the first layer of structural yarns, first encapsulating yarns disposed on the second layer of structural yarns, the first encapsulating yarns being aligned with the first structural yarns, and second encapsulating yarns being aligned with the second structural yarns, the second encapsulating yarns being alternatively woven above one of the first encapsulating yarns and below one of the first structural yarns such that the first encapsulating yarns and second encapsulating yarns cooperate to secure the first layer of structural yarns to the second layer of structural yarns, wherein the first and second structural yarns each have a tenacity of at least 15 grams per denier and a tensile modulus of at least 400 grams per denier, and the first and second encapsulating yarns have a denier between approximately 20 and approximately 1000, and the plurality of fabrics are bonded together by at least one of a resin and a film.

Other aspects and features of the present specification will become apparent to those ordinarily skilled in the art upon review of the following description.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
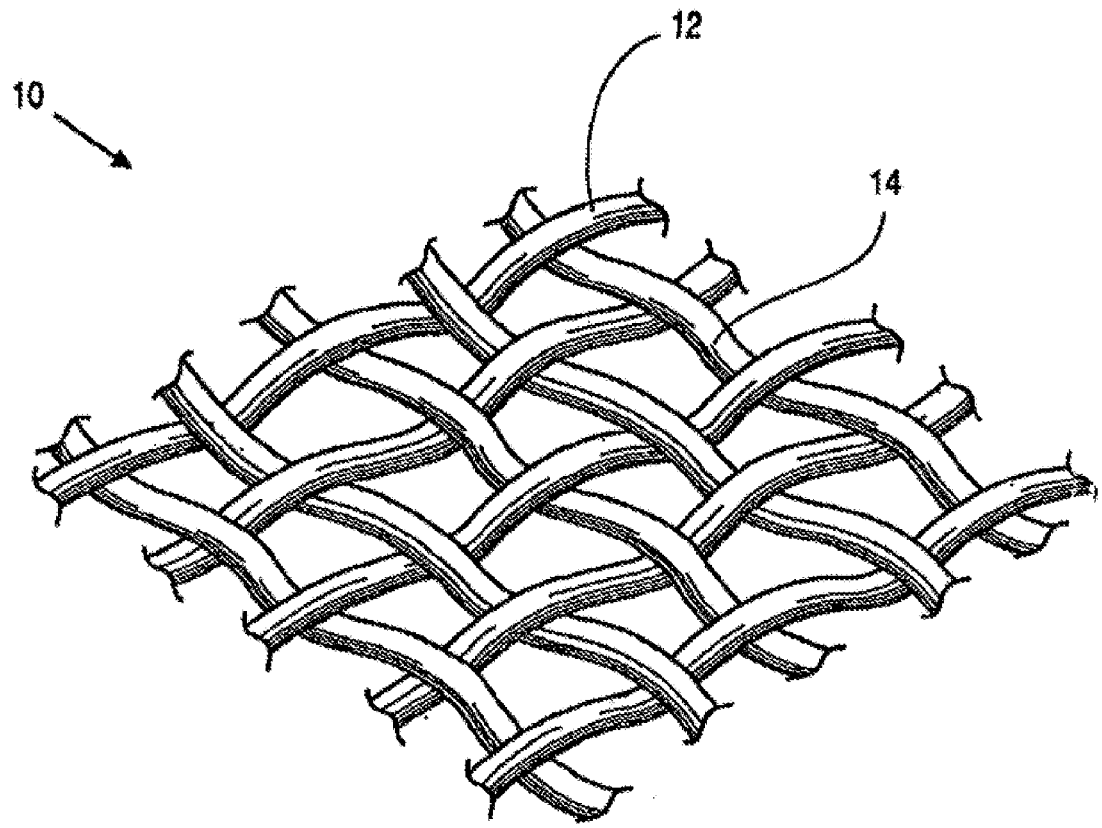
FIG. 1 is a perspective view of a prior art woven fabric.
Figure 2:
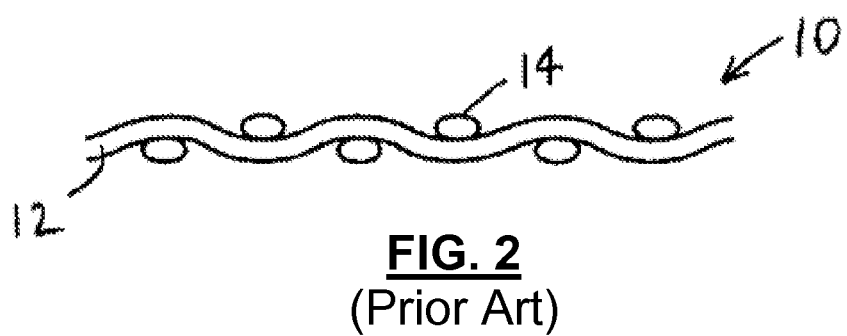
FIG. 2 is an end view of the woven fabric of FIG. 1.
Figure 3:
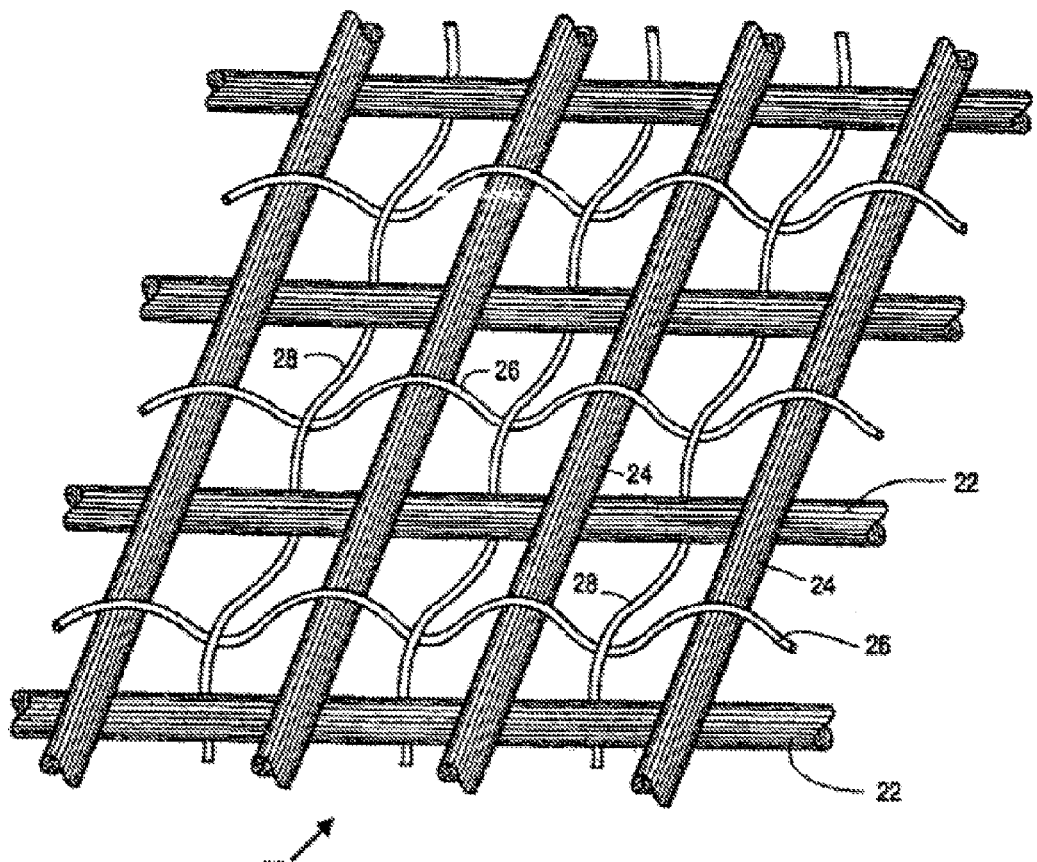
FIG. 3 is a perspective view of a prior art fabric.
Figure 4:
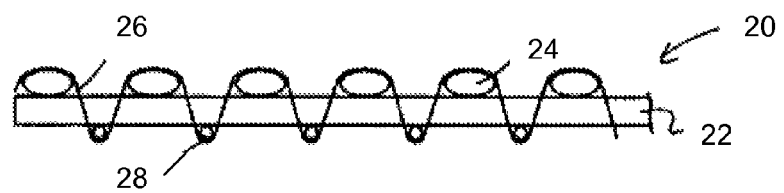
FIG. 4 is an end view of the prior art fabric of FIG. 3.

Illustrated in FIGS. 3 and 4 is a prior art fabric, as described in detail in U.S. Patent Application Publication No. 2007/0099526A1 (Van Heerden et al.). As shown, the fabric 20 includes unidirectional warp yarns 22 and weft yarns 24 (also referred to as "structural yarns") that are not woven or interlocked, but instead are provided as adjacent layers. The warp yarns 22 can be considered to define a first structural layer, with the weft yarns 24 defining a second structural layer stacked on top of the first structural layer. The warp yarns 22 are aligned with the longitudinal direction of the fabric 20, and the weft yarns 24 are oriented at about 90 degrees to the warp yarns 22.

The fabric 20 also includes first encapsulating yarns 26 and second encapsulating yarns 28, which are oriented at about 90 degrees with respect to each other. As shown, the first encapsulating yarns 26 are generally parallel to or aligned with the warp yarns 22, while the second encapsulating yarns 28 are generally parallel to or aligned with the weft yarns 24.

The encapsulating yarns 26, 28 are woven together (similar to the woven fabric 10 described above) in a manner that incorporates the structural yarns 22, 24 into the weave, thus "encapsulating" the structural yarns 22, 24 to hold the fabric 20 together.

As best shown in FIG. 4, the first encapsulating yarns 26 are woven above the weft yarns 24 and underneath the second encapsulating yarns 28. Similarly, the second encapsulating yarns 28 are woven under the warp yarns 22 but pass over the first encapsulating yarns 26. Accordingly, the encapsulating yarns 26, 28 weave the first layer of warp yarns 22 and the second layer of weft yarns 24 together to form the fabric 20.

However, while this weaving structure secures the fabric 20 together, it tends to result in high tension being developed in the encapsulating yarns 26, 28 because of a high number of bends in the encapsulating yarns 26, 28. This is generally undesirable, as it may cause damage to the encapsulating yarns 26, 28. Furthermore, this may cause the structural yarns 22, 24 to bundle up, which tends to reduce the mechanical properties of the fabric 20 since this provides more space for resin and the fiber content in the final composite part is therefore reduced.

Van Heerden et al. addresses this issue by packing the structural yarns very tightly together so that even if the encapsulating yarns have a high tension and bundling of structural yarns occurs, there is no or limited extra space within the woven fabric 20. This may be a solution for certain applications, where the minimization of the weight of the individual fabric layers is not crucial. However, in other applications, such as in aerospace composite structures, weight reduction is a primary goal, and producing such densely packed fabrics may not be desirable.

Turning now to FIGS. 5 to 8, shown therein is a quasi-unidirectional fabric 30 according to one embodiment of the present invention, which addresses at least some of these issues. The fabric 30 includes unidirectional warp yarns 32 and weft yarns 34 (also referred to as "structural yarns") that are not woven or interlocked, but are provided as adjacent layers. The warp yarns 32 can be considered to define a first structural layer, with the weft yarns 34 defining a second layer that is stacked or disposed on top of the first layer.

As shown, the warp yarns 32 are oriented in a first direction, while the weft yarns 34 are oriented in a second direction at about 90 degrees to the first direction. In some examples, the first direction may be in alignment with the longitudinal direction of the fabric 30. In other examples the first direction may be angularly offset from the longitudinal direction of the fabric. Furthermore, the angle between the first direction and the second direction need not be 90 degrees.

The fabric 30 also includes first longitudinal encapsulating yarns 36 and second transverse encapsulating yarns 38. As shown, the longitudinal encapsulating yarns 36 may be generally parallel to the warp yarns 32 (and aligned in the longitudinal direction of the fabric 30), while the transverse encapsulating yarns 38 may be generally parallel to the weft yarns 34 (and generally transverse to the longitudinal direction of the fabric).

Figure 6:
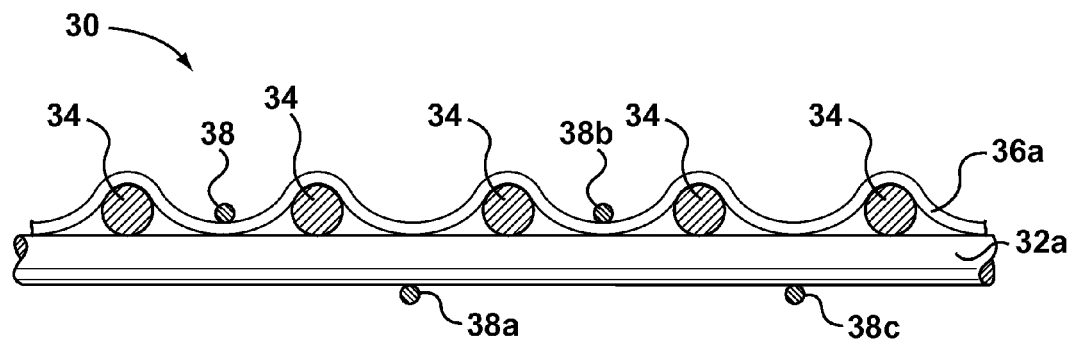
FIG. 6 is a cross-sectional end view of the quasi-unidirectional fabric of FIG. 5 taken along line 6-6.
Figure 7:
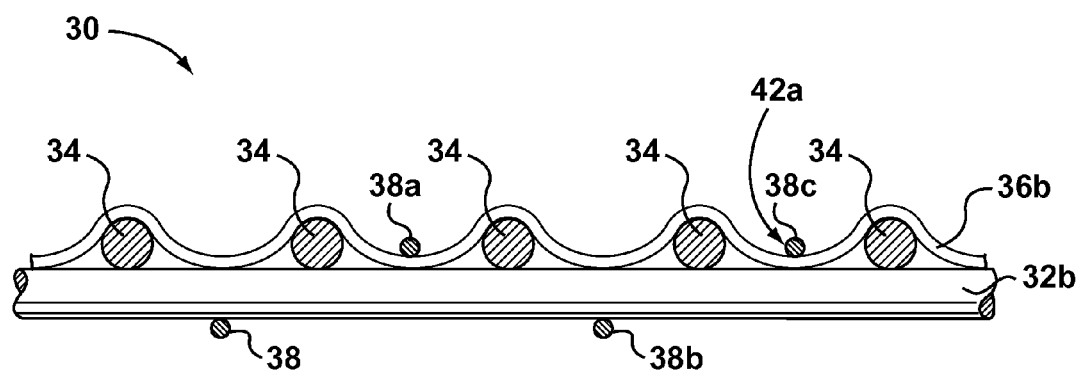
FIG. 7 is a cross-sectional end view of the quasi-unidirectional fabric of FIG. 5 taken along line 7-7.
Figure 8:
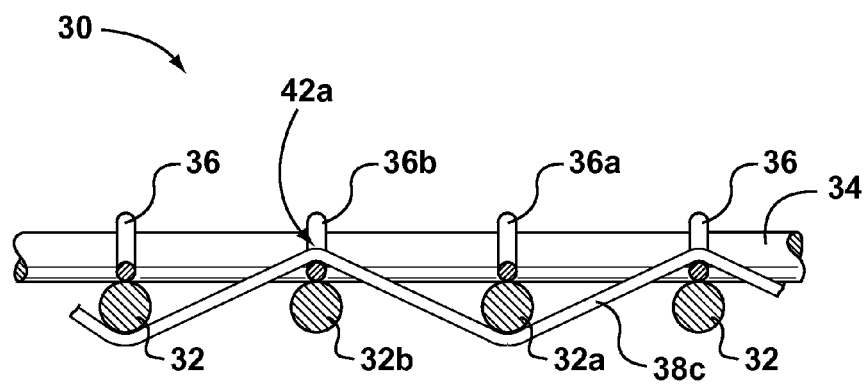
FIG. 8 is a cross-sectional end view of the quasi-unidirectional fabric of FIG. 5 taken along line 8-8.

The various elements of the fabric 30 are arranged so that the longitudinal encapsulating yarns 36 are not woven over or under any of the structural yarns 32, 34. Rather, each of the longitudinal encapsulating yarns 36 is provided on only one side of the fabric 30, overlaid or stacked on top of one of the warp yarns 32. For example, as best shown in FIG. 8, each longitudinal encapsulating yarn 36 may be overlaid on top of one of the warp yarns 32 in general alignment with that warp yarn 32 (and passing over the weft yarns 34, as best shown in FIGS. 6 and 7). In other examples, the longitudinal encapsulating yarns 36 can be offset somewhat from the warp yarns 32. In some examples, the longitudinal encapsulating yarns 36 may be all or partially received within gaps between adjacent warp yarns 32.

The transverse encapsulating yarns 38 are alternatively woven below the warp yarns 32 and above the longitudinal encapsulating yarns 36, with the transverse encapsulating yarns 38 engaging the longitudinal encapsulating yarns 36 at crossover points or nodes 42. As shown, the transverse encapsulating yarns 38 may be provided generally intermediate the weft yarns 34.

Figure 5:
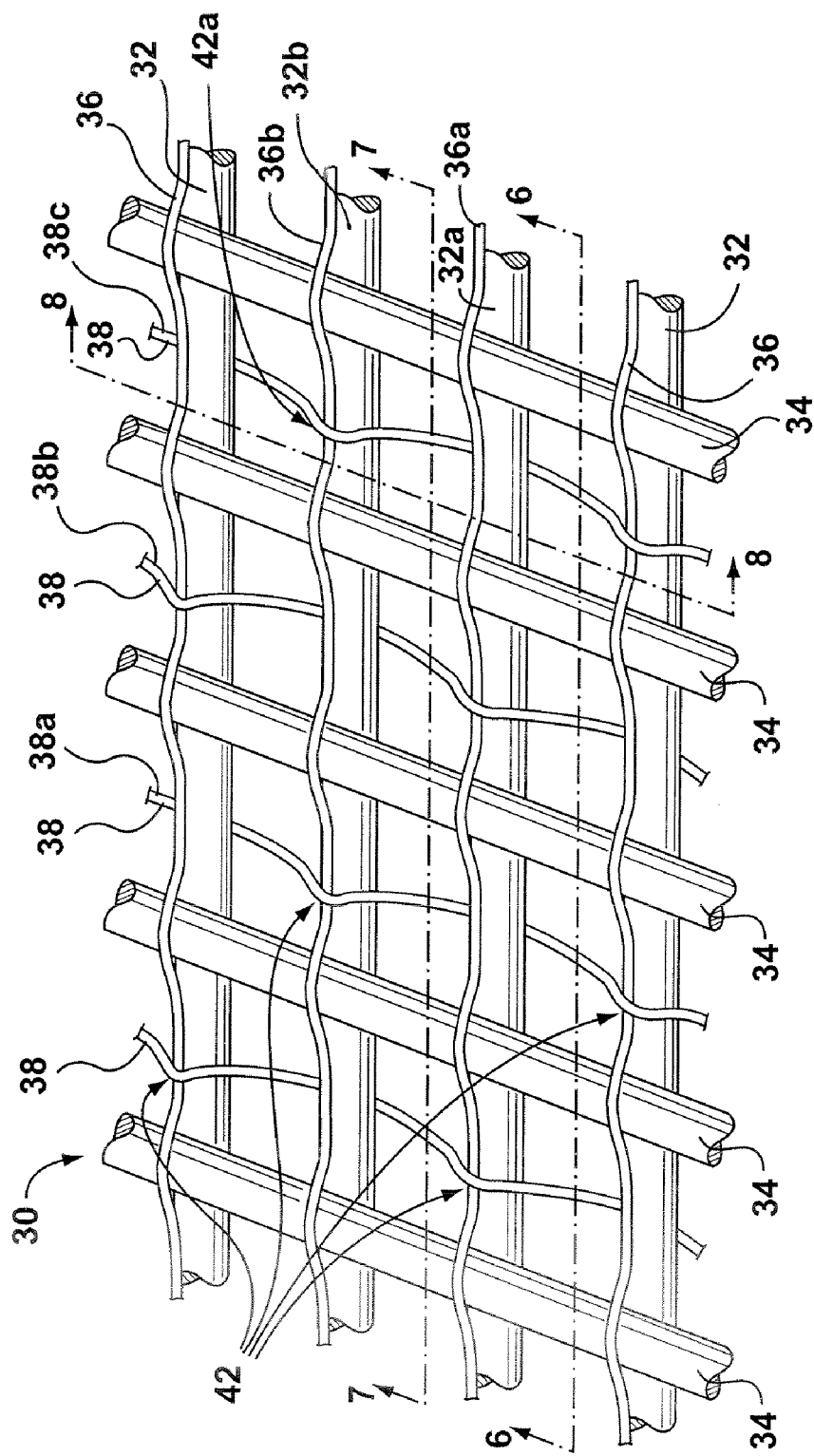
FIG. 5 is a perspective view of a quasi-unidirectional fabric according to one embodiment of the invention.

Adjacent transverse encapsulating yarns 38 may have a staggered or alternating weave, as shown in FIGS. 5 to 7. For example, a first transverse encapsulating yarn 38a passes below a first warp yarn 32a and the adjacent first longitudinal encapsulating yarn 36a (as shown in FIG. 6); the same transverse encapsulating yarn 38a then passes over a second longitudinal encapsulating yarn 36b and the adjacent second warp yarn 32b (as shown in FIG. 7).

Conversely, a second transverse encapsulating yarn 38b (next to or adjacent the first transverse encapsulating yarn 38a) has an alternating weave patterns, and will pass over the first longitudinal encapsulating yarn 36a and the first warp yarn 32a (as shown in FIG. 6), then below the second warp yarn 32b and the second longitudinal encapsulating yarn 36b (as shown in FIG. 7).

The longitudinal encapsulating yarns 36 and the transverse encapsulating yarns 38 engage each other at the crossover points or nodes 42. For example, as shown in FIG. 8, a third transverse encapsulating yarn 38c alternatively passes under the first warp yarn 32a and over the second warp yarn 32b, engaging the second longitudinal encapsulating yarn 36b at node 42a. In this manner, the encapsulating yarns 36, 38 cooperate to provide an interwoven structure that secures the first structural layer of unidirectional warp yarns 32 to the second structural layer of unidirectional weft yarns 34, holding the fabric 30 together.

This weaving structure tends to causes a reduction in the yarn tension of the encapsulating yarns 36, 38, and may reduce the bundling or crimping of the structural yarns 32, 34. As a result, the structural yarns 32, 34 of the fabric 30 tend to remain flatter, have a reduced gap between the yarns 32, 34 and lead to increased fiber content in finished structural panels.

In the fabric 30 as shown, the warp yarns 32 and weft yarns 34 are generally perpendicular with respect to each other, and the encapsulating yarns 36, 38 are generally parallel to the warp yarns 32 and weft yarns 34, respectively. However, the warp yarns 32, weft yarns 34, and the encapsulating yarns 36, 38 could be oriented at other non-perpendicular angles.

Furthermore, while the terms "warp yarn" and "weft yarn" are used herein, these terms are specifically not meant to be limiting, and the particular weave structure of the fabric 30 could be used with either encapsulating yarns 36, 38 aligned with either the warp yarns 32 (as shown) or with the weft yarns 34.

The fabric 30 generally does not have to be cross-plied as in previous processes for the production of unidirectional fabrics, since two unidirectional structural layers are joined together during the weaving operation, (i.e. the first structural layer comprising the warp yarns 32 and the second structural layer comprising the weft yarns 34). Further, the unidirectional structural yarns 32, 34 in the fabric 30 generally are not substantially constrained by the encapsulating yarns 36, 38 since the encapsulating yarns 36, 38 typically comprise a low strength, low modulus yarn, as described in greater detail below.

The fabric 30 may be woven on standard weaving looms, including rapier, shuttle, air jet and water jet looms. It may also be produced on knitting machines of the type described in U.S. Pat. Nos. 3,592,025 and 3,819,461, on three dimensional weaving machines of the type described in U.S. Pat. Nos. 5,465,760, 5,085,252, 6,129,122 and 5,091,245, or on equipment designed to produce two or more unidirectional layers held together by stitching, as described for example in U.S. Pat. Nos. 4,416,929, 4,550,045 and 4,484,459.

In some examples, the structural yarns 32, 34 may be yarns having a tenacity of about 15 grams per denier and higher, and with a tensile modulus of at least about 400 grams per denier. Some examples of suitable yarns could include carbon, basalt and glass fibers. Other examples include aramid and copolymer aramid fibers (produced commercially by DuPont and Teijin under the trade names Kevlar®, Twaron®, and Technora®), extended chain polyethylene fibers (produced commercially by Honeywell, and DSM, under the trade names Spectra®), and Dyneema®), polyethylene fibers and films produced by Synthetic Industries and sold under the trade name Tensylon®, poly(p-phenylene-2,6-benzobisoxa-zole) (PBO) (produced by Toyobo under the commercial name Zylon®), and Liquid crystal polymers produced by Kuraray under the trade name Vectran®. Other suitable yarns may also be used.

The encapsulating yarns 36, 38 are generally of significantly smaller denier than the structural yarns 34, 34 and have significantly lower tenacities and tensile moduli. In some examples, the encapsulating yarns 36, 38 have a tenacity of less than 10 grams per denier, and a tensile modulus of less than 40 grams per denier. In one example, the encapsulating yarns 36, 38 are made of polyester having a tenacity of about 7.9 grams per denier, and a tensile modulus of about 39.5 grams per denier. In other examples, a vast range of suitable yarns can be used for the encapsulating yarns 36, 38.

In some examples, the denier of the encapsulating yarns 36, 38 may range from between about 20 denier to about 1000 denier, depending on the size of the structural yarns 32, 34 and the desired structural application. In some embodiments, the encapsulating yarns 36, 38 may have a denier of less than 20.

The encapsulating yarns 36, 38 are generally of a much smaller size than the structural yarns 32, 34. The diameter of the encapsulating yarns 36, 38 may be selected based on the moduli and strength parameters of the encapsulating yarns 36, 38. In some examples, the encapsulating yarns 36, 38 may have a diameter that is between about 2.5% and about 14% of the diameter of the structural yarns 32, 34.

The strength and the tensile moduli of the encapsulating yarns 36, 38 may preferably be selected such that the resulting fabric 30 has structural performance that matches or exceeds the performance of a standard structural fabric made using the same sizes of structural yarn but with a different weave pattern (such as the fabrics 10 and 20 described above).

In some examples, the encapsulating yarns 36, 38 may be selected from a wide range of fibers. Some suitable example fibers include natural fibers, such as cotton, wool, sisal, linen, jute and silk. Other suitable fibers include manmade or synthetic fibers and filaments, such as regenerated cellulose, rayon, polynosic rayon and cellulose esters, synthetic fibers and filaments, such as acrylics, polyacrylonitrile, modacrylics such as acrylonitrile-vinyl chloride copolymers, polyamides, for example, polyhexamethylene adipamide (nylon 66), polycaproamide (nylon 6), polyundecanoamide (nylon 11), polyolefin, for example, polyethylene and polypropylene, polyester, for example, polyethylene terephthalate, rubber and synthetic rubber and saran. Glass, carbon or any other high performance fiber may also be used as encapsulating yarns 36, 38.

Staple yarns may also be used and may include any of the above fibers, low denier staple yarns or any combination of these yarns. Staple yarns may be used particularly where the base properties of continuous filament yarns exceed the maximum allowable properties required in a quasi-unidirectional fabric. Staple yarns, by the discontinuous nature of their filaments that form the yarn, tend to have much lower tensile and modulus properties as opposed to yarns composed of continuous filaments.

The performance of the final fabric 30 is generally a function of the properties of the encapsulating yarns 36, 38 and the structural yarns 32, 34. In composite structures, maximizing the amount of the structural fibres in a given volume tends to be of primary importance, as higher fibre volume fraction generally signifies higher structural properties. Therefore, in some examples it may be desirable that the encapsulating yarns 36, 38 have a denier that is as low as practical to weave the fabric 30.

The pick count of a structural fabric used in an application without a resin can be calculated from the maximum tightness that can be woven in a plain weave fabric of 100% structural yarn. In some embodiments, the yarn count in the structural yarn per inch should be about 50% of this value plus or minus two picks for optimal strength. The pick count may vary from this value but the structural properties may decrease.

Prior art fabrics, such as the Van Heerden fabric 20 described above, tends to have yarn-bundling or crimping issues due to relatively high encapsulating yarn tension. The fabric 30 disclosed herein tends to overcome these issues by providing the fabric construction with lower encapsulating yarn tension.

In the fabric 30 shown in FIGS. 5 to 8, it may be desirable to minimize the weight of the encapsulating yarns 36, 38 as a percent of the total weight of the fabric 30, since the encapsulating yarns 36, 38 may not contribute as much to the structural strength of the fabric 30 as the structural yarns 32, 34. Conversely, an increased number of encapsulating yarns 36, 38 may result in a more durable, stable fabric 30. However, the fabric 30 will tend to be heavier and may have reduced structural properties due to the increased constraints on the structural yarns 32, 34.

In some examples, the lowest denier, lowest strength encapsulating yarns 36, 38 that can be woven and that satisfy all or substantially all of the requirements for a particular application may be preferred.

The fabric 30 described herein may be further processed after it has been woven to form a structural member or panel. For example, the fabric 30 may be fabricated into a prepreg using a film or a wet resin, for example. Depending on the application, the film or resin may be applied to one side of the fabric 30, the fabric 30 may be totally impregnated with a resin, or the film may be worked into the fabric 30. In some examples, the film or resin may be a thermoplastic or a thermoset resin. Generally, any known resin or film that can be used to create a prepreg may be used with this fabric 30. Two or more layers of the fabric 30 may also be laminated together to create a multi-layer fabric.

Figure 9:
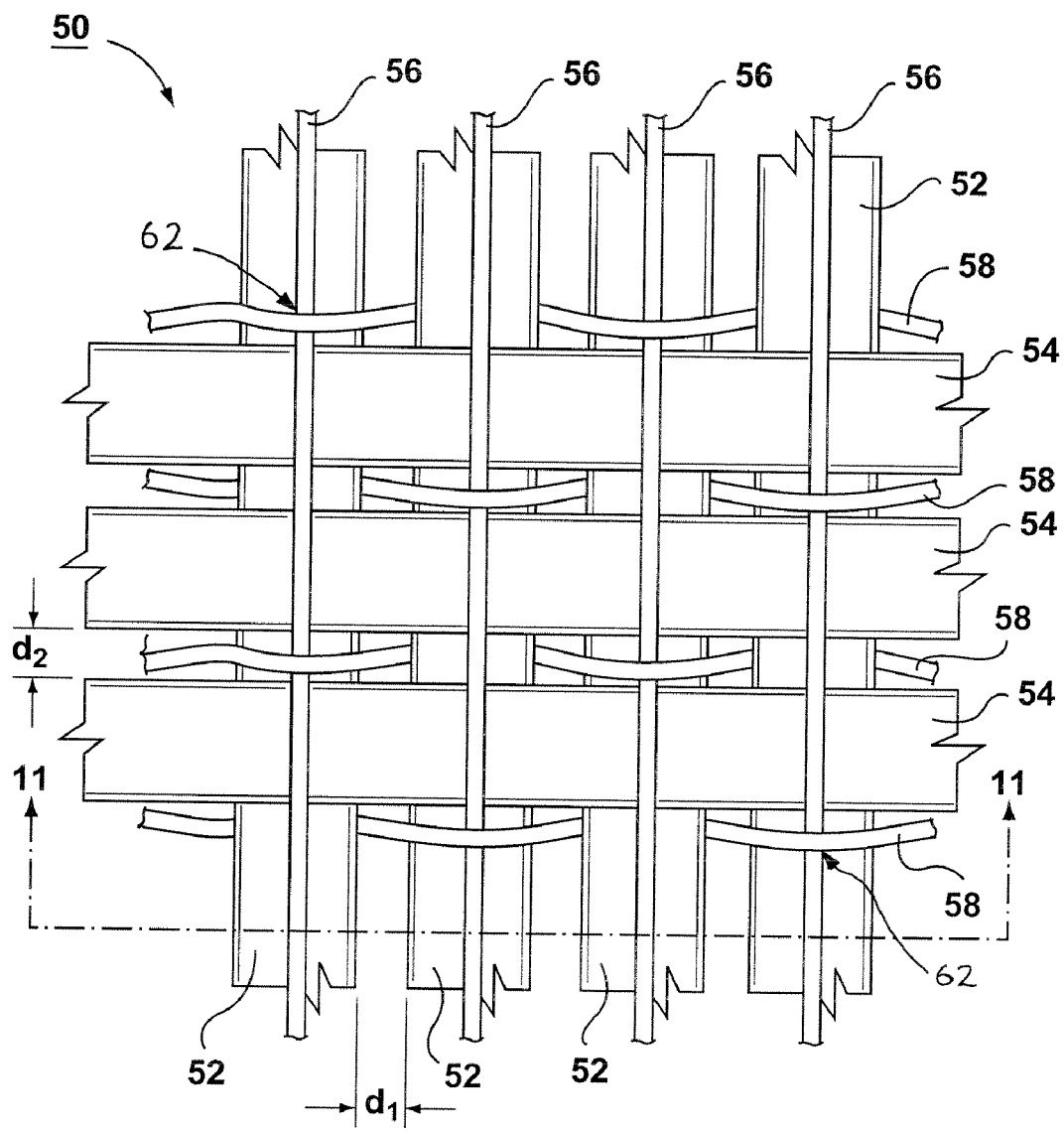
FIG. 9 is a top view of a quasi-unidirectional fabric according to another embodiment of the invention.
Figure 10:
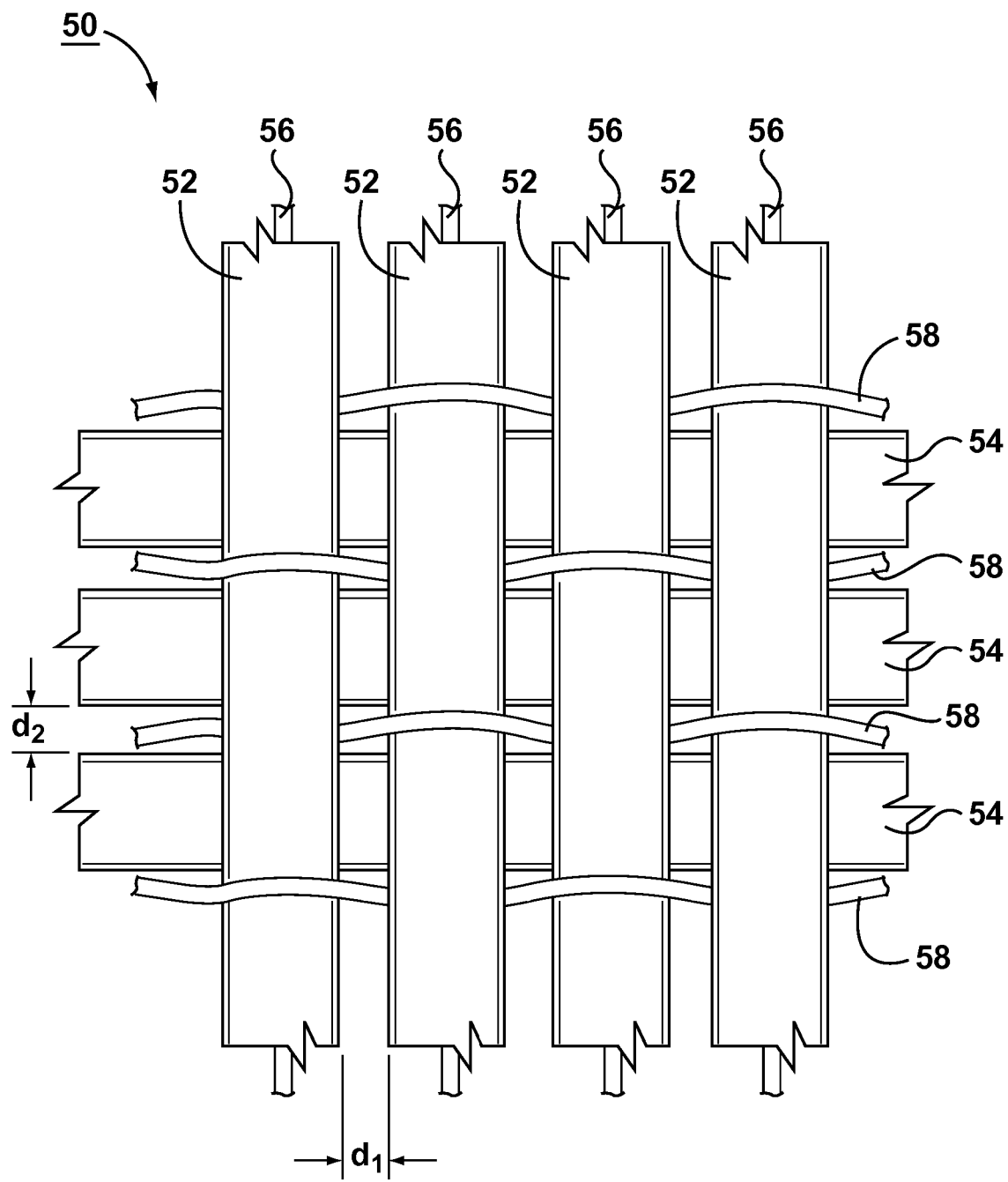
FIG. 10 is a bottom view of the quasi-unidirectional fabric of FIG. 9.
Figure 11:
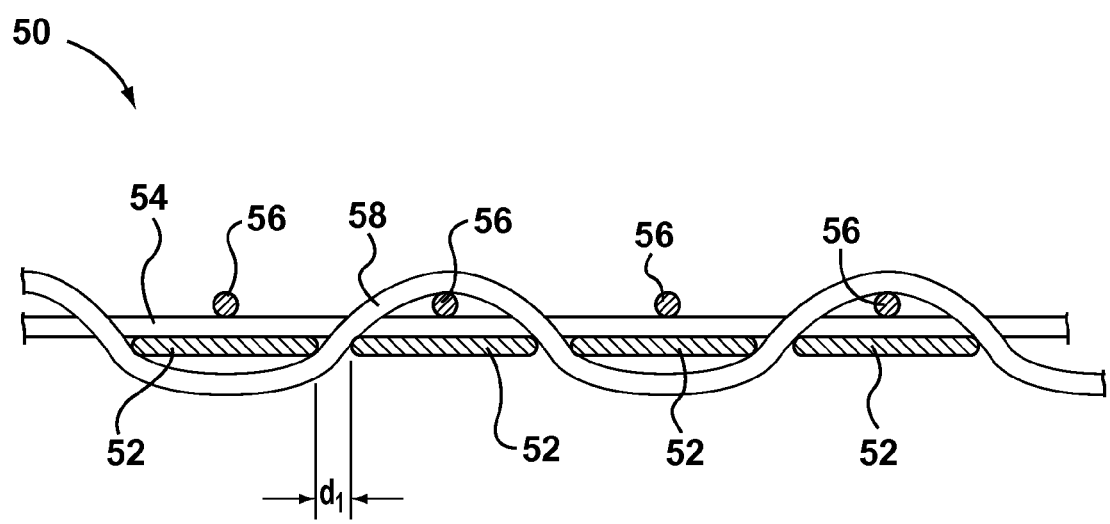
FIG. 11 is a cross sectional end view of the quasi-unidirectional fabric of FIG. 9 taken along line 11-11.

Turning now to FIGS. 9, 10 and 11, shown therein is a fabric 50 according to another embodiment of the invention. The fabric 50 has yarn pattern similar to the fabric 30 described above, and includes a first structural layer of unidirectional warp yarns 52, and a second structural layer of unidirectional weft yarns 54 stacked or disposed on top of the first structural layer.

As shown, the warp yarns 52 are oriented in a first direction, while the weft yarns 54 are oriented in a second direction at an angle to the first direction. In some embodiments, the angle between the first direction and the second direction is about 90 degrees. In some examples, the first direction may be in alignment with the longitudinal direction of the fabric 50, but other orientations could also be used.

As best shown in FIG. 11, in this example, the warp yarns 52 and weft yarns 54 are generally flat unidirectional yarns (as opposed to the more circular warp yarns 32 and weft yarns 54 illustrated above in FIGS. 5-8). As a result the overall fabric 50 tends to have a flat or very flat configuration.

The fabric 50 also includes first longitudinal encapsulating yarns 56 and second transverse encapsulating yarn 58. As shown, the longitudinal encapsulating yarns 56 are generally parallel to the warp yarns 52 (and aligned in the longitudinal direction of the fabric 30), while the transverse encapsulating yarns 58 are generally parallel to the weft yarns 54 (and generally transverse to the longitudinal direction of the fabric 50).

The longitudinal encapsulating yarns 56 are not woven over or under any of the structural yarns 52, 54. Rather, each of the longitudinal encapsulating yarns 56 is provided on only one side of the fabric 50, overlaid or stacked on top of one of the warp yarns 52. For example, as best shown in FIG. 11, each longitudinal encapsulating yarn 56 is overlaid on top of one of the warp yarns 52 in general alignment with that warp yarn 52. Furthermore, as shown, the transverse encapsulating yarns 58 are alternatively woven below the warp yarns 52 and above the longitudinal encapsulating yarns 56, the transverse encapsulating yarns 58 engaging the longitudinal encapsulating yarns 56 at crossover points or nodes 62.

The warp yarns 52 are spaced apart a first distance $d_1$, while the weft yarns are spaced apart a second distance $d_2$. The first distance d1 and the second distance $d_2$ may be selected to provide a desired density to the fabric 50. In some examples, the first distance $d_1$ may be selected to be as small as possible (just large enough to accommodate the crimp in the transverse encapsulating yarns 58 as they pass over and under adjacent warp yarns 52). Furthermore, the second distance $d_2$ may be selected to be as small as possible (slightly larger than the width of the transverse encapsulating yarns 58).

EXAMPLE

A comparison was made between a known fabric, FR CM A101 100.0 0000, 230 g/m2 3K Toray T300 carbon 14×14, marketed by Barrday Inc. as Sentinel™ fabric, and a concept quasi-unidirectional fabric 230 g/m2 3K Toray T300 carbon 14×14, using the same materials as the Sentinel fabric but with the structure as shown in FIGS. 9-11. Both fabrics were treated with the same resin, namely Epoxy NB301.

During testing, the Sentinel fabric showed a tensile strength of 768 MPa, while the concept fabric showed a tensile strength of 807 MPa. This represents a performance increase of about 5.1% in the tensile strength. Furthermore, the Sentinel fabric showed a flexural strength of 701 MPa, while the concept fabric showed a flexural strength of 931 MPa. This represents a performance increase of about 32.8%.

Thus, the use of quasi-unidirectional fabrics according to the embodiments describe herein tends to provide improved performance in at least two areas, namely tensile strength and flexural strength over prior art fabrics.

The fabrics described herein can be designed to produce a quasi-unidirectional fabric for use in various structural applications, such in rigid panels for use in the aerospace industry. The fabrics may be used by themselves or in combination with various other fabrics and materials to produce structural elements. Such other fabrics may include woven fabrics made of carbon fibres, and basalt or glass fibers. The other fabrics may also include various unidirectional products based on known unidirectional technology where the structural fibers are aramids, polyethylene or poly(p-phenylene-2,6-benzobisoxazole) (PBO), for example.

The fabrics described herein may generally be used in any combination with the materials listed above and may replace any one material or combination of materials in an existing structural fabric. In addition, the fabrics described herein may be laminated together or laminated with films to produce structural elements for various applications, including rigid and resilient applications. The proportions of each material selected and the design of the structural elements may vary depending on the intended application (i.e., particular specifications for aerospace applications).

In some example fabrics, the ratio of the diameter of the encapsulating yarns to the diameter of the structural yarns should be as low as possible (with all other factors being equal) to allow for tight packing of the structural yarns. Generally, the smaller the diameter of the encapsulating yarn and/or the more deformable the encapsulating yarn is, the less potential there is for the encapsulating yarn either to constrain or to impart undesired crimp into the structural yarns and thereby adversely affect structural performance.

While the above description provides examples of one or more fabrics, structural members and panels, processes and/or apparatuses, it will be appreciated that other fabrics, structural members and panels, processes and/or apparatuses may be within the scope of the present description as interpreted by one of skill in the art.

The invention claimed is:

1. A fabric for use in structural applications, comprising:
   a. a first layer of structural yarns comprising first structural yarns aligned in a first direction;
   b. a second layer of structural yarns comprising second structural yarns aligned in a second direction at an angle relative to the first direction, the second layer of structural yarns disposed on top of the first layer of structural yarns;
   c. first encapsulating yarns disposed on the second layer of structural yarns, the first encapsulating yarns being aligned with the first structural yarns; and
   d. second encapsulating yarns being aligned with the second structural yarns, the second encapsulating yarns being alternatively woven above one of the first encapsulating yarns and below one of the first structural yarns such that the first encapsulating yarns and second encapsulating yarns cooperate to secure the first layer of structural yarns to the second layer of structural yarns.

2. The fabric of claim 1, wherein each of the first encapsulating yarns is overlaid on top of one of the first structural yarns.

3. The fabric of claim 1, wherein the angle between the second direction and the first direction is approximately 90 degrees.

4. The fabric of claim 1, wherein adjacent second encapsulating yarns have a staggered weave pattern.

5. The fabric of claim 1, wherein the first structural yarns and second structural yarns are high-performance unidirectional yarns.

6. The fabric of claim 1, wherein the first and second structural yarns have a tenacity of at least about 15 grams per denier, and a tensile modulus of at least about 400 grams per denier.

7. The fabric of claim 6, wherein the first and second structural yarns are selected from the group consisting of aramid fibres, polyethylene fibers, liquid crystal polymer fibers, poly(p-phenylene-2,6-benzobisoxazole) (PBO) fibers, carbon, basalt and glass fibers.

8. The fabric of claim 1, wherein the first and second encapsulating yarns have a tenacity of approximately 7.9 grams per denier, and a tensile modulus of approximately 39.5 grams per denier.

9. The fabric of claim 1, wherein the first and second encapsulating yarns have a denier between approximately 20 and approximately 1000.

10. The fabric of claim 9, wherein the first and second encapsulating yarns are selected from the group consisting of natural fibers and synthetic fibers.

11. The fabric of claim 9, wherein the first and second encapsulating yarns are natural fibres selected from the group consisting of cotton, wool, sisal, linen, jute and silk.

12. The fabric of claim 9, wherein the first and second encapsulating yarns are synthetic fibers selected from the group consisting of cellulose, rayon, acrylics, modacrylics, polyamides, polyolefin, polyester, rubber, synthetic rubber and saran.

13. The fabric of claim 1, wherein the diameter of the first and second encapsulating yarns is between about 2.5% and about 14% of the diameter of the first and second structural yarns.

14. The fabric of claim 1, wherein the first and second structural yarns are generally flat unidirectional yarns.

15. The fabric of claim 1, wherein the first and second encapsulating yarns have tenacities and tensile moduli substantially less than tenacities and tensile moduli of the first and second structural yarns.

16. A structural member comprising a plurality of fabrics bonded together, each fabric comprising:
   a. a first layer of structural yarns comprising first structural yarns aligned in a first direction;
   b. a second layer of structural yarns comprising second structural yarns aligned in a second direction at an angle relative to the first direction, the second layer of structural yarns disposed on top of the first layer of structural yarns;
   c. first encapsulating yarns disposed on the second layer of structural yarns, the first encapsulating yarns being aligned with the first structural yarns; and
   d. second encapsulating yarns being aligned with the second structural yarns, the second encapsulating yarns being alternatively woven above one of the first encapsulating yarns and below one of the first structural yarns such that the first encapsulating yarns and second encapsulating yarns cooperate to secure the first layer of structural yarns to the second layer of structural yarns.

17. The structural member of claim 16, wherein each of the first encapsulating yarns is overlaid on top of one of the first structural yarns.

18. The structural member of claim 16, wherein the plurality of fabrics are bonded together by at least one of a resin and a film.

19. The structural member of claim 16, wherein the first and second structural yarns have a tenacity of at least about 15 grams per denier, and a tensile modulus of at least about 400 grams per denier.

20. The structural member of claim 16, wherein the first and second encapsulating yarns each have a denier between approximately 20 and approximately 1000.

21. The structural member of claim 16, wherein the first and second encapsulating yarns have tenacities and tensile moduli substantially less than tenacities and tensile moduli of the first and second structural yarns.

22. A rigid structural member comprising a plurality of fabrics bonded together, each fabric comprising:
   a. a first layer of structural yarns comprising first structural yarns aligned in a first direction;
   b. a second layer of structural yarns comprising second structural yarns aligned in a second direction at approximately 90 degrees relative to the first direction, the second layer of structural yarns disposed on top of the first layer of structural yarns;
   c. first encapsulating yarns disposed on the second layer of structural yarns, the first encapsulating yarns being aligned with the first structural yarns; and
   d. second encapsulating yarns being aligned with the second structural yarns, the second encapsulating yarns being alternatively woven above one of the first encapsulating yarns and below one of the first structural yarns such that the first encapsulating yarns and second encapsulating yarns cooperate to secure the first layer of structural yarns to the second layer of structural yarns;
   e. wherein the first and second structural yarns each have a tenacity of at least 15 grams per denier and a tensile modulus of at least 400 grams per denier, and the first and second encapsulating yarns have a denier between approximately 20 and approximately 1000, and the plurality of fabrics are bonded together by at least one of a resin and a film.

* * * * *